S. ROBERTS.

Manufacture of Barrels.

No. 6,044. Reissued Sept. 8, 1874.

WITNESSES

W. J. Newman,

R. M. Parr

By

INVENTOR

Sheridan Roberts

Addison H. Winchell, Assignee

Leggett & Leggett, Attorneys.

UNITED STATES PATENT OFFICE.

SHERIDAN ROBERTS, OF CLEVELAND, ASSIGNOR, BY MESNE ASSIGNMENTS, TO ADDISON H. WINCHELL, OF HURON, OHIO.

IMPROVEMENT IN THE MANUFACTURE OF BARRELS.

Specification forming part of Letters Patent No. 32,340, dated May 14, 1861; reissue No. 6,044, dated September 8, 1874; application filed August 11, 1874.

*To all whom it may concern:*

Be it known that SHERIDAN ROBERTS, of Cleveland, in the county of Cuyahoga, State of Ohio, invented new and useful Improvements in the Manufacture of Barrels; and I do hereby declare the following to be such a full, clear, and exact description as will enable a person skilled in the art to make and use the same, reference being had to the accompanying drawings, which form a part of this specification.

Figure 1:
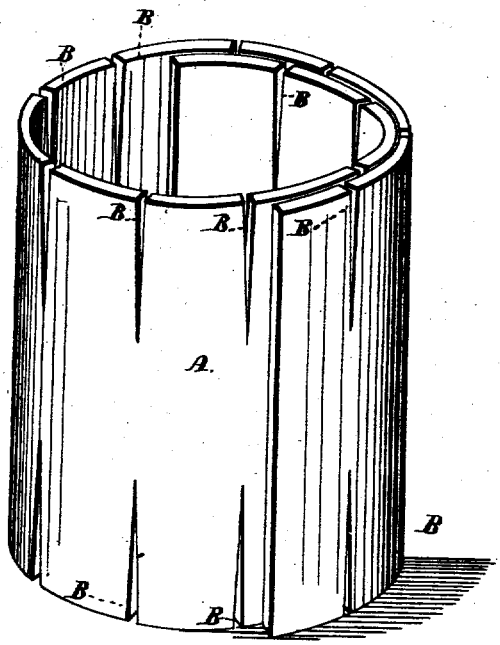
Figure 2:
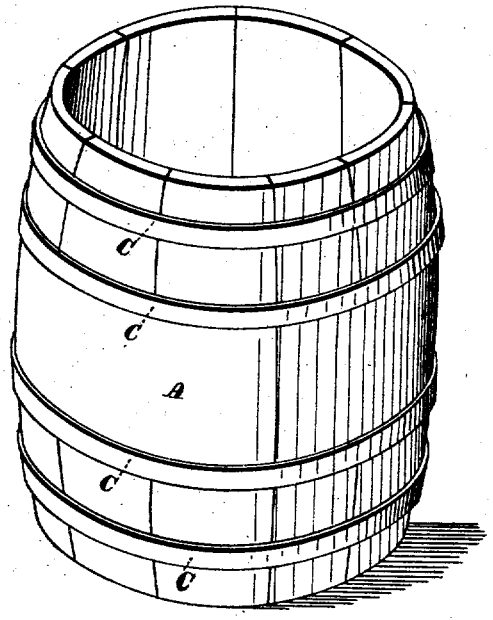

In the drawings, Figure 1 is a perspective view of the body of a barrel without the hoops. Fig. 2 is a view of the same with the hoops driven upon it.

This invention relates to the formation of the body of a barrel from volute sheets cut or removed from the surface of solid cylinders, and forming the bulge of the barrel, by forming notches or slots from the edges toward the center, or cutting out or removing gores or wedge-shaped pieces from each edge, so that, by bringing these cut surfaces into contact by means of hooping the body of the barrel, the barrel thus formed will have the desired bulge.

The volute or body of the barrel A is cut with a straight knife from the surface of a log of suitable length for the barrels by means of any suitable lathe or engine. A sufficient length of such volute is cut off from the sheet as will be sufficient for a barrel or cask, as seen at A in Figs. 1 and 2 By means of a circular saw, or any suitable instrument, gores or wedge-shaped pieces or slots B are sawed or cut out, extending from the edge of the volute toward its center line. The gores or wedge-shaped pieces that are thus cut out may be of suitable size and number to give to the barrel the proper bulge or shape. The gores or slots B being all sawed or cut, as described, the two edges of the sheet or volute are brought into apposition, by which means the gore-spaces are closed up, and the body or cylinder part of the barrel is thus formed into the desired bulge.

If necessary or desirable to economize the use of the timber, such pieces as are not of themselves sufficient for a barrel may be united to form a barrel, in which case the body would be composed of two or more pieces instead of one piece only.

The chines and croze are formed on the volute in any suitable manner, and the barrel-head inserted as usual.

What I claim is—

1. The body or cylinder of a barrel formed from a single volute piece having gore or wedge shaped pieces or slots cut from the same in a direction from the edges toward the center line thereof, substantially as and for the purposes set forth.

2. The body or cylinder part of a barrel formed of two or more volute pieces having wedge-shaped pieces, slots, or gores cut from the same in a direction from the edges toward the center line thereof, substantially as and for the purposes set forth.

3. The body or cylinder portion of a barrel, composed of one or more pieces of volute, having gore or wedge shaped pieces or slots cut from the edges thereof in a direction toward the center line, and provided with suitable croze and chines, substantially as set forth.

In testimony that I claim the foregoing I have hereunto set my hand this 10th day of July, 1874.

ADDISON H. WINCHELL.

Witnesses:
JOHN H. WILBOR,
JOHN A. WICKHAM, Jr.